(12) United States Patent
Hwang

(10) Patent No.: US 7,266,226 B2
(45) Date of Patent: Sep. 4, 2007

(54) FINGERPRINT RECOGNITION APPARATUS WITH AUTOMATIC FINGER CONTACT SENSING FUNCTION

(75) Inventor: Moon-Sung Hwang, Kwang Myung (KR)

(73) Assignee: Keico Hightech Inc., Seoul (KR)

( * ) Notice: Subject to any disclaimer, the term of this patent is extended or adjusted under 35 U.S.C. 154(b) by 743 days.

(21) Appl. No.: 10/476,058

(22) PCT Filed: Mar. 13, 2002

(86) PCT No.: PCT/KR02/00433

§ 371 (c)(1),
(2), (4) Date: Oct. 27, 2003

(87) PCT Pub. No.: WO02/095666

PCT Pub. Date: Nov. 28, 2002

(65) Prior Publication Data

US 2004/0136575 A1    Jul. 15, 2004

(30) Foreign Application Priority Data

May 19, 2001   (KR) .............................. 2001-14707

(51) Int. Cl.
*G06K 9/00* (2006.01)

(52) U.S. Cl. .................................................... 382/124

(58) Field of Classification Search ................ 382/124, 382/126; 283/68; 235/380, 494; 340/5.52, 340/5.53, 5.82, 5.8; 356/71; 902/3, 4, 25
See application file for complete search history.

(56) References Cited

U.S. PATENT DOCUMENTS

| | | | |
|---|---|---|---|
| 4,357,597 A * | 11/1982 | Butler | 382/115 |
| 4,582,985 A * | 4/1986 | Lofberg | 235/380 |
| 6,304,666 B1 * | 10/2001 | Warren et al. | 382/124 |
| 6,912,299 B1 * | 6/2005 | Hoshino | 382/124 |
| 6,937,748 B1 * | 8/2005 | Schneider et al. | 382/126 |
| 6,970,584 B2 * | 11/2005 | O'Gorman et al. | 382/126 |

FOREIGN PATENT DOCUMENTS

| | | | |
|---|---|---|---|
| JP | 04-88586 A | | 3/1992 |
| JP | 2000222555 | * | 8/2000 |
| KR | 1993-949 B1 | | 2/1993 |
| KR | 2000-3172 Y1 | | 9/2000 |

* cited by examiner

*Primary Examiner*—Samir Ahmed
(74) *Attorney, Agent, or Firm*—Robert E. Bushnell, Esq.

(57) ABSTRACT

A fingerprint recognition apparatus is provided. A user's finger brings into contact with both a fingerprint recognition module and a touch switch conductor by installing the touch switch conductor on the front surface of the fingerprint recognition module. By signal generated from the touch switch conductor sensing the user's finger without any preliminary action, a power-supplying unit supplies a power to the fingerprint recognition module. Therefore, the fingerprint recognition apparatus is simplified in its use.

3 Claims, 4 Drawing Sheets

FINGERPRINT RECOGNITION APPARATUS WITH AUTOMATIC FINGER CONTACT SENSING FUNCTION

This application makes reference to, incorporates the same herein, and claims all benefits accruing under 35 U.S.C. §§ 119, 120, and § 365 from my application FINGERPRINT RECOGNITION APPARATUS WITH AUTOMATIC FINGER CONTACT SENSING FUNCTION filed with the Korean Industrial Property Office on 19 May 2001 and there duly assigned Serial No. 2001-0014707, and my International Application entitled FINGERPRINT RECOGNITION APPARATUS WITH AUTOMATIC FINGER CONTACT SENSING FUNCTION filed on 13 Mar. 2002 and duly assigned Serial No. PCT/KR02/00433.

TECHNICAL FIELD

The present invention relates to a fingerprint recognition apparatus, and more particularly to a fingerprint recognition apparatus, in which locks installed on doors of buildings, cars or depositories are opened by a user's fingerprint without keys or passwords of button devices.

BACKGROUND ART

As well known to those skilled in the art, keys or button devices have been used to open the locks. However, if the keys are lost by the carelessness of the user or fraudulently used by others, the locks may be opened. Further, in case of the button devices, the passwords may be exposed to others by any corrosion or traces by salinity of the user's finger. Alternatively, when the passwords are inputted by the owner, they may be easily exposed to others.

Therefore, a fingerprint recognition apparatus has been recently introduced. Specific user's fingerprint data are inputted and stored as reference data on memory of the fingerprint recognition apparatus. A fingerprint recognition module is operated by pressing a start button. After then, the user's finger contacts the fingerprint recognition modules. Thus, the user's fingerprint is recognized. If the user's fingerprint is identified with the reference data stored in the memory, the lock is opened.

However, this conventional fingerprint recognition apparatus has drawbacks as follows.

The fingerprint recognition process includes two steps, e.g., a step of supplying the power to the fingerprint recognition module by pressing the start button and a step of fingerprint's contacting the fingerprint recognition module. That is, the start button should be pressed, thereby resulting in user's troublesomeness.

DISCLOSURE OF THE INVENTION

Therefore, the present invention has been made to in view of the above problems. An object of the present invention is to provide a fingerprint recognition apparatus, which simplifies the fingerprint recognition process. In the fingerprint recognition apparatus, a touch switch conductor is installed on the front surface of a fingerprint recognition window of a finger recognition module, thereby bring the user's finger into contact with both the print recognition module and the touch switch conductor at the same time. Therefore, without the pressing of the start button, a power supplying unit supplies a power to the fingerprint recognition module by a signal generated from the touch switch conductor, which already recognized the user's finger. Thereby, the fingerprint recognition process is simplified.

In accordance with the present invention, the above and other objects can be accomplished by the provision of a fingerprint recognition apparatus comprising: A fingerprint recognition module with a fingerprint recognition window; a controlling circuit for controlling the fingerprint recognition module; a power supplying unit for supplying a power; a housing; a finger insertion hole exposed to the front surface of the housing; and a touch switch circuit for recognizing the finger's insertion into the finger insertion hole and generating a recognition signal. The fingerprint recognition module is installed in the housing so that the fingerprint recognition window is exposed to the finger insertion hole. The controlling circuit makes the power supplying unit to supply the power to the fingerprint recognition module in reply to the recognition signal.

Preferably, an extrusion may be extruded from the lower surface of the finger insertion hole and a conductor of the touch switch circuit may be formed on the upper surface of the extrusion.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
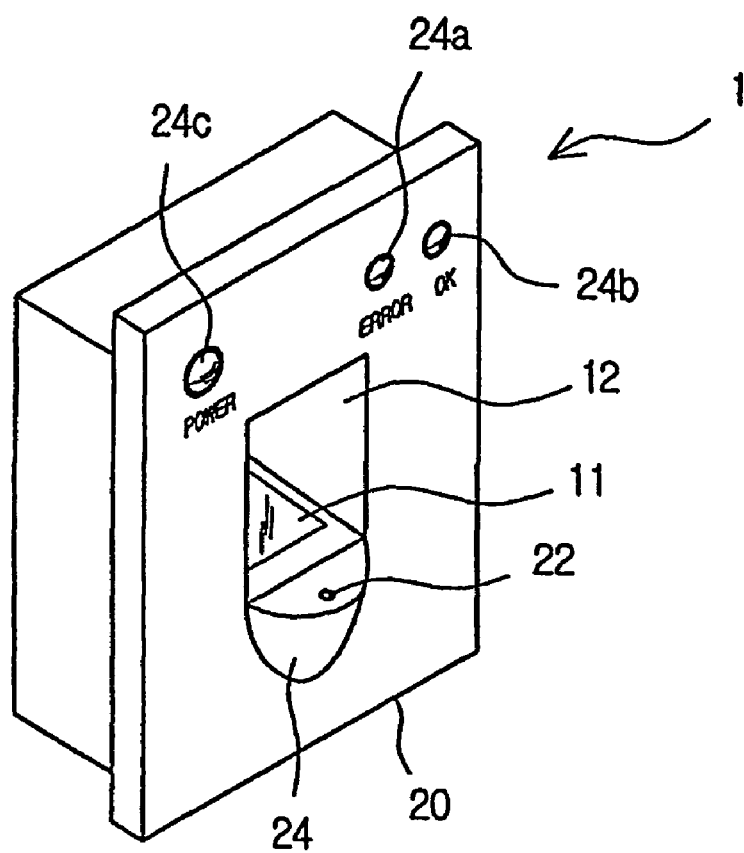
FIG. 1 is a perspective view of a fingerprint recognition apparatus in accordance with the present invention.
Figure 2:
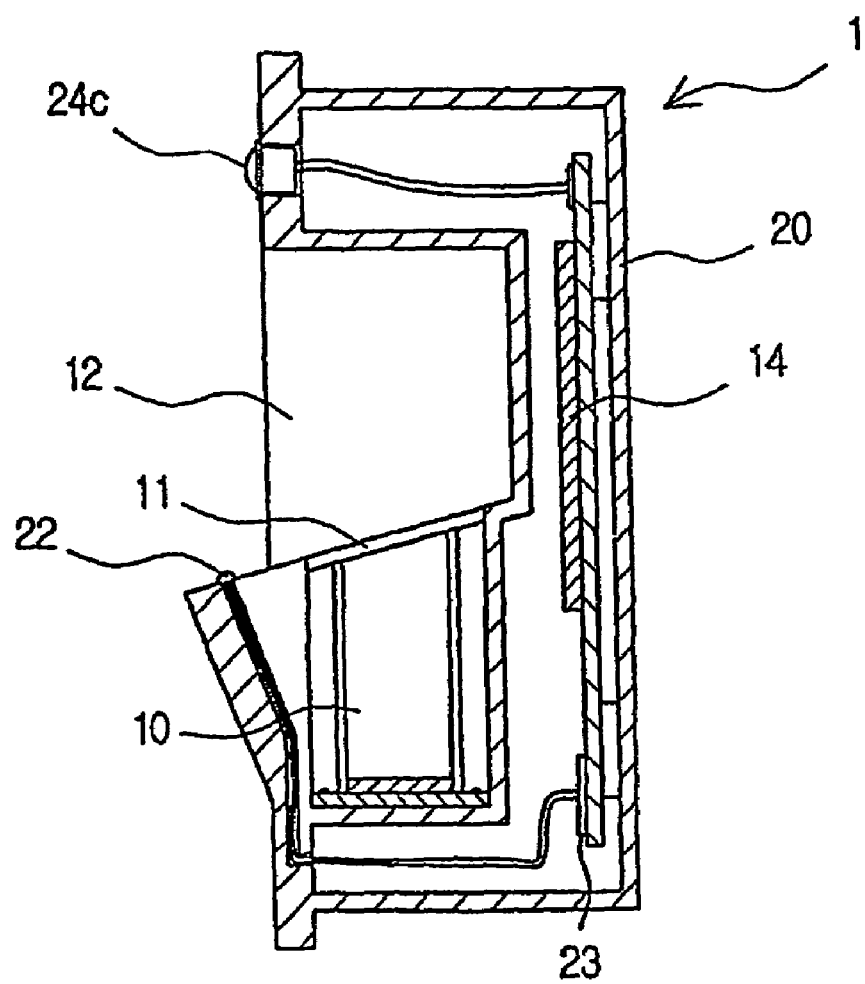
FIG. 2 is a cross-sectional view of the fingerprint recognition apparatus in accordance with the present invention.

FIG. 1 is a perspective view of a fingerprint recognition apparatus in accordance with the present invention. FIG. 2 is a cross-sectional view of the fingerprint recognition apparatus in accordance with the present invention.

As shown in FIGS. 1 and 2, a fingerprint recognition apparatus includes a fingerprint recognition module with a fingerprint recognition window, a controlling circuit for controlling the fingerprint recognition module, a power supplying unit for supplying a power; a housing, a finger insertion hole exposed to the front surface of the housing, and a touch switch circuit for recognizing the finger's insertion into the finger insertion hole and generating a recognition signal. The fingerprint recognition module is installed in the housing so that the fingerprint recognition window is exposed to the finger insertion hole. The controlling circuit makes the power-supplying unit to supply the power to the fingerprint recognition module in reply to the recognition signal.

Preferably, an extrusion may be extruded from the lower surface of the finger insertion hole and a conductor of the touch switch circuit may be formed on the upper surface of the extrusion.

Figure 3:
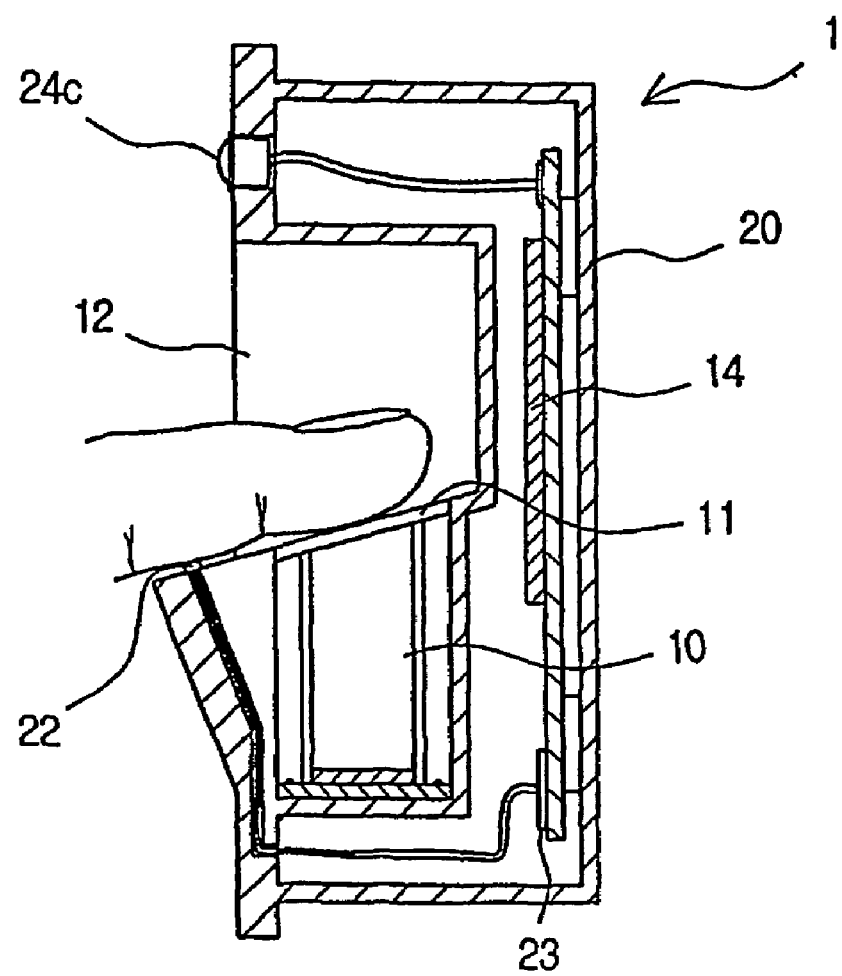
FIG. 3 is a cross-sectional view of the fingerprint recognition apparatus in use in accordance with the present invention.
Figure 4:
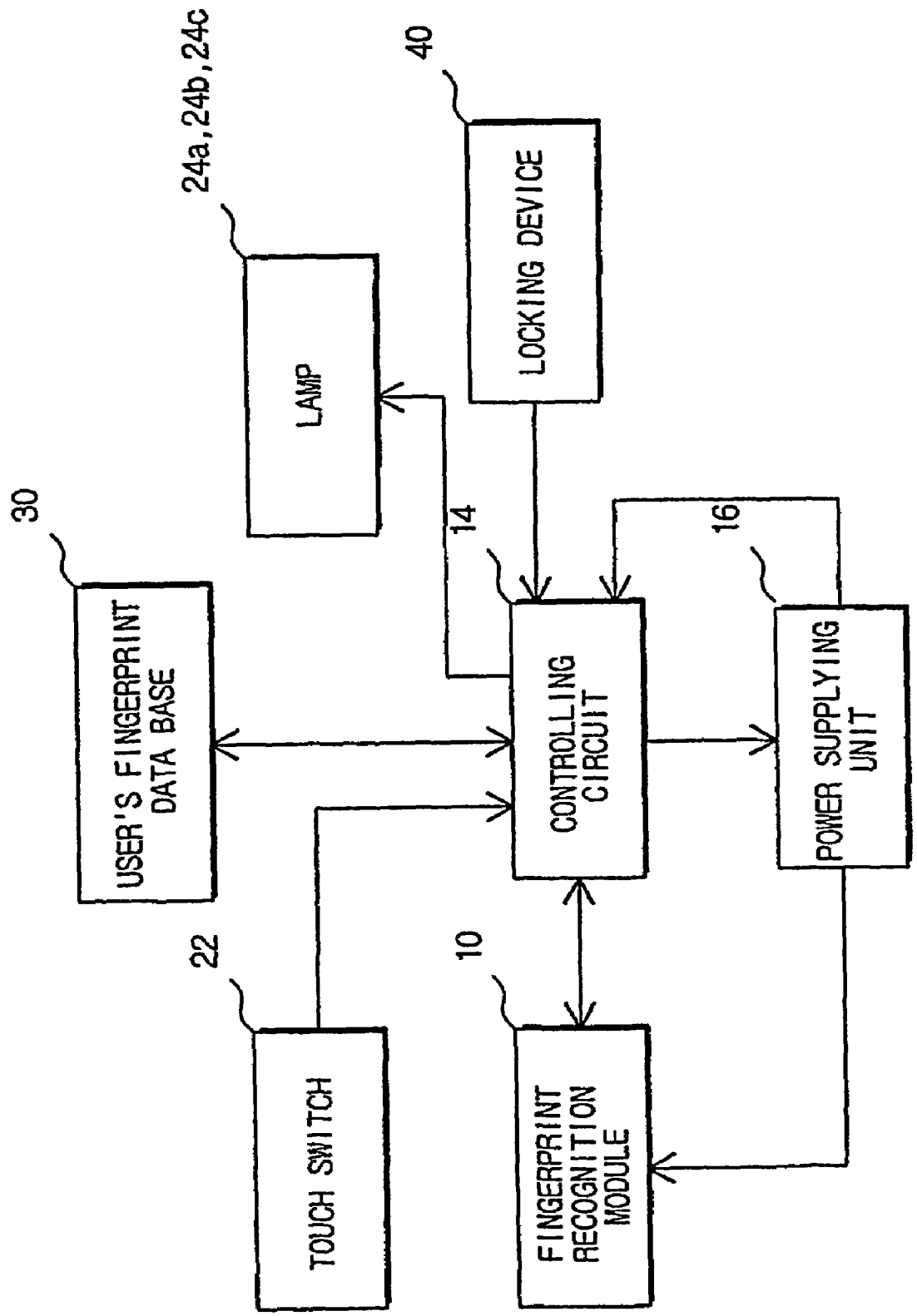
FIG. 4 is a flow chart showing a fingerprint identification process in accordance with the present invention.

FIG. 3 is a cross-sectional view of the fingerprint recognition apparatus in use in accordance with the present invention, and FIG. 4 is a flow chart showing a fingerprint identification process in accordance with the present invention.

With reference to FIGS. 3 and 4, a finger insertion hole 12 is exposed to the front surface of a housing 20 of the fingerprint recognition apparatus 1. A fingerprint recognition module 10 is installed so that a fingerprint recognition window 11 is exposed to the finger insertion hole 12. An extrusion 24 is formed on the lower surface of the finger insertion hole 12. A touch switch conductor 22 is formed on the upper surface of the extrusion 24. When a user's finger contacts the fingerprint recognition window 11, the touch switch conductor 22 recognizes the finger and sends signal to a touch switch circuit 23. Then, a controlling circuit 14 makes a power supplying unit 16 to supply a power to the fingerprint recognition module 10. The fingerprint contacting the fingerprint recognition window 11 is transmitted to the controlling circuit 14 via the finger recognition module 10. Then, the transmitted fingerprint data are compared with a user's fingerprint data base 30 and judged. After this judgment, a corresponding output signal is generated. According to the output signal, a lamp 24a or 24b indicating OK or ERROR is lighted and a locking device 40 is operated. A lamp 24c indicating ON/OFF of the fingerprint recognition apparatus is formed on a side of the lamps 24a and 24b.

As described above, the touch switch conductor 22 of the present invention is formed on the front extrusion 20 of the fingerprint recognition module 10. Therefore, the user's finger contacts the fingerprint recognition module 10 and is simultaneously recognized by the touch switch conductor 22, thereby supplying the power to the fingerprint recognition module 10 and reducing the user's troublesomeness.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

Accordingly, the present invention provides a fingerprint recognition apparatus, which can recognize the user's fingerprint without any preliminary action by installing the touch switch conductor on the front surface of the fingerprint recognition module.

What is claimed is:

1. A fingerprint recognition apparatus comprising:
a fingerprint recognition module with a fingerprint recognition window;
a controlling circuit for controlling said fingerprint recognition module;
a power supplying unit for supplying a power;
a housing;
a finger insertion hole exposed to the front surface of said housing; and
a touch switch circuit for recognizing the finger's insertion into said finger insertion hole and generating a recognition signal,
wherein said fingerprint recognition module is installed in said housing so that said fingerprint recognition window is exposed to said finger insertion hole, and said controlling circuit makes said power supplying unit to supply the power to said fingerprint recognition module in reply to said recognition signal; an extrusion is extruded from the lower surface of said finger insertion hole, and a touch switch conductor is formed on the upper surface of said extrusion in a manner that the touch switch conductor is simultaneously touched by a finger whenever the finger touches the fingerprint recognition window.

2. A fingerprint recognition apparatus comprising:
a housing having a flat surface;
a fingerprint recognition window formed on the flat surface of the housing;
a fingerprint recognition module disposed inside the housing, the fingerprint recognition module being coupled to the fingerprint recognition window;
a controlling circuit disposed inside the housing, the controlling circuit controlling the fingerprint recognition module; and
a touch switch circuit disposed inside the housing, the touch switch circuit recognizing an insertion of a finger and sending a recognition signal to the controlling circuit;
a touch switch conductor formed on the flat surface of the housing next to the fingerprint recognition window in a manner that the touch switch conductor is simultaneously touched by a finger whenever the finger touches the fingerprint recognition window; the touch switch conductor coupled to the touch switch circuit; the touch switch conductor recognizing the finger and sending a signal to the touch switch circuit; and
a power supplying unit coupled to the controlling circuit, the power supplying unit supplying power to the fingerprint recognition module whenever the controlling circuit receives the recognition signal.

3. The fingerprint recognition apparatus as claimed in claim 2, comprised of the housing having a finger insertion hole on a front surface; the finger insertion hole having a side wall; the flat surface of the housing formed on the side wall of the finger insertion hole.

* * * * *